United States Patent [19]

Staege

[11] Patent Number: 4,940,379
[45] Date of Patent: Jul. 10, 1990

[54] TRUCK LOADING

[76] Inventor: Ruediger Staege, Am Pfuhl 11-13, D-1000 Berlin 45, Fed. Rep. of Germany

[21] Appl. No.: 846,702

[22] Filed: Mar. 31, 1986

[30] Foreign Application Priority Data

Mar. 29, 1985 [DE] Fed. Rep. of Germany ....... 3511455

[51] Int. Cl.⁵ .............................................. B65G 67/02
[52] U.S. Cl. ..................... 414/401; 14/71.7; 14/72.5
[58] Field of Search ............... 414/401, 399, 402, 400, 414/584, 345, 347, 343, 344, 341, 340, 396, 395, 390, 391, 392, 349, 352; 187/1 R, 9 R, 9 E; 14/69.5, 71.5, 72.5, 71.7, 71.3

[56] References Cited

U.S. PATENT DOCUMENTS

| | | | |
|---|---|---|---|
| 2,644,971 | 7/1953 | Rowe | 14/71.7 |
| 3,018,495 | 1/1962 | Hosbein | 14/71.7 |
| 3,018,496 | 1/1962 | Hosbein | 14/71.7 |
| 4,063,619 | 12/1977 | Drews | 187/1 R X |
| 4,488,326 | 12/1984 | Cherry | 14/72.5 |

FOREIGN PATENT DOCUMENTS 2841003  4/1980  Fed. Rep. of Germany ...... 414/498

*Primary Examiner*—Frank L. Werner
*Attorney, Agent, or Firm*—Ralf H. Siegemund

[57] ABSTRACT

A loading device, for automatic rear end loading of trucks or trailers by means of a forklifting type of device being movably mounted on a platform that can be lowered and lifted is improved by a docking and loading gate defining a particular position for the rear end of a truck or trailer on one hand and of a direction of loading on the other hand, the position being established with respect to a truck or trailer when positioned in and at the loading dock; a loading bridge is arranged in the loading gate for bridging the space from the loading platform to the truck or trailer when in the loading dock, the bridge is lowered to obtain particular positions in which the bridge exerts a particular load upon the truck or trailer in the loading dock which position is maintained as the load and forklift move across the bridge, onto the truck or trailer.

3 Claims, 1 Drawing Sheet

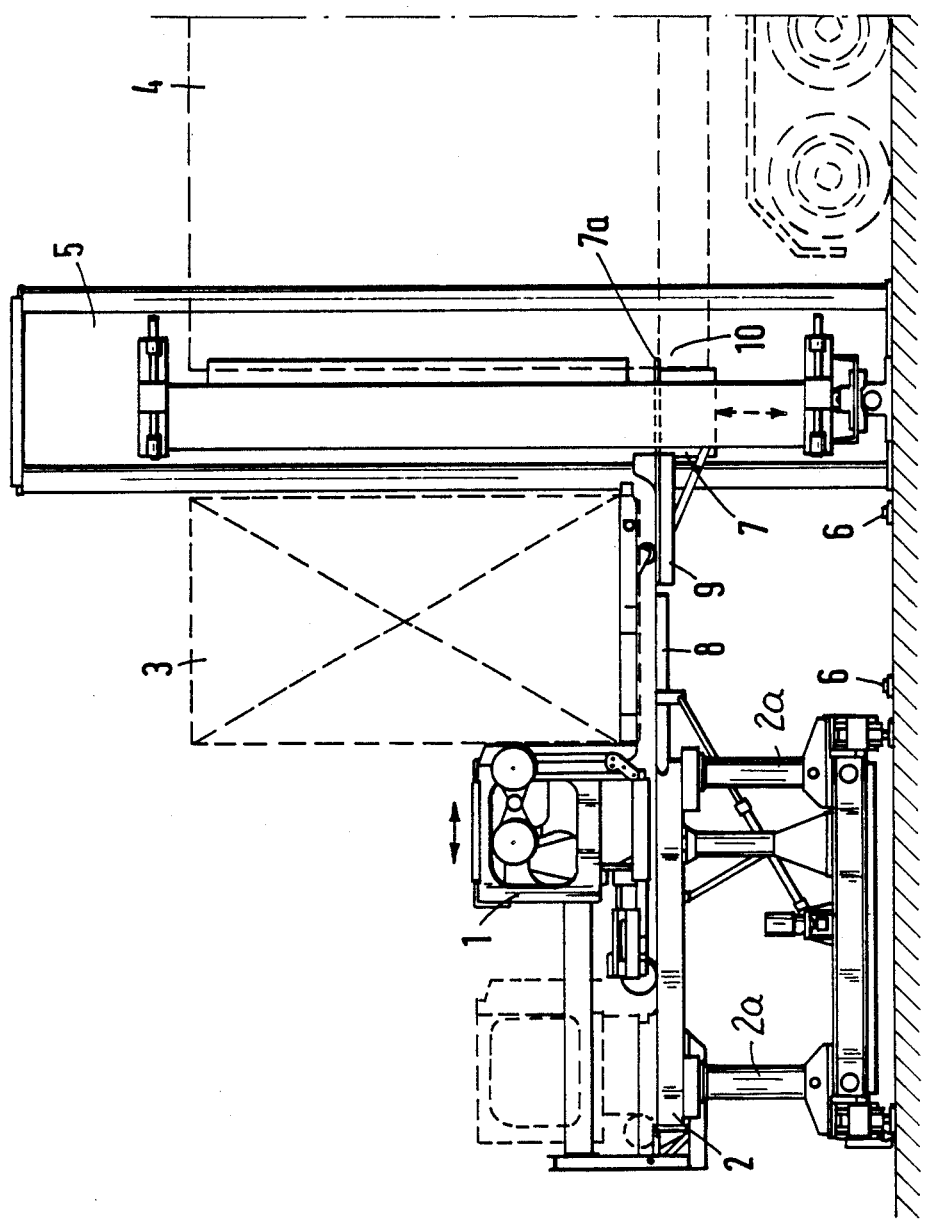

TRUCK LOADING

BACKGROUND OF THE INVENTION

The present invention relates to automated rear end loading of trucks or trailers using pallets as well as a lifting fork type unmanned loading device which receives the pallets from a height adjustable platform device or the like and moves the pallets through a height adjustable loading bridge into the truck or trailer which in turn has been positioned in relation to the direction of movement provided by and of which the loading device is capable.

German printed patent application Nos. 31 32 899 and 33 16 419 disclose and describe devices of the type to which the invention pertains. Generally speaking the loading of trucks or trailers by means of a loading bridge or the like encounters certain problems. The level of that bridge must be matched on one hand with a loading surface of the truck or trailer and with a platform that carries the loading device, vehicle or machine on the other hand. This problem specifically is encountered for an increasing load causing an increasing lowering of the loading surface of the truck so that a level compensation must be provided for because it is necessary that the transfer of and by the loading vehicle, device or machine is carried out without encountering any step.

DESCRIPTION OF THE INVENTION:

It is an object of the present invention to provide for a new and improved loading device of the type referred to above such that in a very simple manner there is continuously provided a level compensation between truck (trailer) loading surface on one hand and any transfer and bridging equipment on the other hand.

It is therefore a specific object of the present invention to provide a new and improved automatic loading structure for rear end loading of trucks or trailers with pallets under utilization of an unmanned forklifting type loading machine or vehicle which takes over a pallet from a level or height adjustable platform while moving across a height adjustable loading bridge into the truck or trailer.

In accordance with the preferred embodiment of the present invention the objects are attained by providing a loading dock or the like which predetermines the positioning of the vehicle in relation to the requisite direction of loading, in relation to which the loading machine must operate; a loading bridge is arranged in the dock which bridge is initially preloaded to exert an expected loading force upon the respective loading surface of the truck or trailer and as the load is shifted across that bridge and into the loading surface, that preloading bias is gradually released.

The invention offers the advantage that the actual construction features necessary for practicing the invention are quite minimal so that the rear loading end of the truck or trailer can in fact be retained in the level of the loading bridge.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

the FIGURE illustrates a side view of the loading device in accordance with the preferred embodiment of the present invention for practicing the best mode thereof whereby specifically a phase of the loading process is illustrated wherein one or several pallets are being moved across a loading bridge onto the loading surface of the cargo space of a truck.

Proceeding now to the detailed description of the drawings the FIGURE illustrates a loading machine 1 constructed as a forklifting, vehicle manned device with forwardly extending fork elements 1a and operating in an unmanned environment. The forklifting device and vehicle in turn is mounted so as to run on a platform 2. The dotted lines depict the vehicle and device 1 in retracted position. Platform 2 is mounted and positioned for vertical adjustment using lifting posts 2a. The platform 2 may be lowered or raised by means of hydraulics.

The loading vehicle and machine 1 is provided for moving pallets 3 from some level into the cargo or loading space of a truck 4. The rear or trailing end 4a of this truck is positioned in a dock and stationary loading device 5 so that the cargo space in the truck 4 has a definite position in relation to the direction of movement and operation of the loading machine and vehicle 1.

In the particular instance illustrated in the FIGURE a phase of operation is depicted wherein a collection or transport platform (not shown) has been removed from the area and space between the platform 2 on one hand and the dock structure 5 on the other hand. This collection platform is moved on rails 6 in a direction transverse to the plane of the drawings. The particular pallet or pallets 8 which this collection platform had been moved and placed into that space between the devices 5 and 2 is now being held by and on the forks Ia of the loading machine and vehicle 1.

The transfer from loading platform 2 and the aforementioned space to the loading surface and cargo space of the truck 4 is carried out by means of a loading bridge 7. This bridge 7 constitutes a part of the loading dock 5 i.e. it is connected thereto and is height adjustably mounted therein. The space between the bridge 7 and the platform 2 is bridged by means of pivotal, fold-up bridge parts 8 and 9 being pivotally linked to the platform 2 and the bridge 7 respectively. The bridge 7 moreover is provided with a dock part 7a that extends beyond and overhangs the rear loading end 10 of truck 4 and into the cargo space thereof.

The bridge 7 must be adjusted hydraulically in vertical direction but other height adjusting structures and drives can be used. In operation and after the truck 4 has been placed into the illustrated position, the bridge 7 is first lowered from an initial and starting position wherein the bridge is positioned well above the loading surface in the yet unloaded truck 4. The bridge 7 is specifically lowered until the extension 7a comes to rest on the truck end 10. The bridge 7 is now "loaded" (biased) so that the force acting on the end 10 is equal to the load which corresponds or will correspond to the sum total of the loads that later, during the transfer, will be exerted upon the truck end 10 by the weight of the pallet plus the weight of the loading machine and vehicle 1. In this particular position one will fix the level of the bridge 7 and the platform with bridge part 8 is now adjusted so that the folded up part 9 of the loading bridge 7 at the same level under load.

During the transfer operation, when the loading vehicle i moves the pallet 3 over the bridge across load end 10 and into the cargo space of truck 4 the force exerted by the hydraulics upon bridge 7 is relaxed so that the level of the bridge 7 is maintained as the vehicle 1 and the load 8 are moved across the bridge and onto the vehicle platform in the cargo space. In other words, the loading vehicle 1 with load 3 is moved across the bridge 8,9,7,7a onto the loading surface of truck 4, the hydraulic bias exerted upon the truck 4 by the bridge part 7a is relaxed to the extent the weight of vehicle 1 and load 3 take over as downwardly directed force that acts on the truck 4. This situation is (or can be) dynamically maintained by causing the platform-bridge 7 to maintain and hold its position as the loads 1-3 are moved on it and exert their force, first on bridge 7 and then on the load surface of the truck 4.

The invention is not limited to the embodiments described above, but all changes and modifications thereof, not constituting departures from the spirit and scope of the invention are intended to be included.

I claim:

1. Loading device, for automatic rear end loading of trucks or trailers by means of a forklifting type device movably mounted on a platform that can be lowered and lifted, the improvement comprising:

a docking and loading gate defining a particular position for the rear end of a truck or trailer on one hand and of a direction of loading on the other hand, the position being established with respect to the truck or trailer when positioned in and at the loading dock; and a loading bridge arranged in said loading gate for bridging space between said loading platform on one hand and a load bearing surface of a truck or trailer when in the loading dock on the other hand, there being means for lowering said bridge to obtain particular positions in which the bridge engages a rear portion of the load surface and exerts a particular load upon the truck or trailer in said loading gate.

2. Loading structure as in claim 1, said bridge constructed to overhang the loading surface of the truck or trailer such that when lowering of the bridge directly a load is exerted in simulating fashion upon the loading surface and the truck or trailer as such, the bridge being normally disengaged from said loading surface.

3. The device as in claim 2 wherein said bridge is adjustable and arrestable as to its vertical orientation and positioning.

* * * * *